US005783230A

United States Patent [19]

Toet et al.

[11] Patent Number: 5,783,230

[45] Date of Patent: Jul. 21, 1998

[54] COMPACTING INSTALLATION

[75] Inventors: Gijsbert Toet, Eksel, Belgium; Anne Huig Den Boer, Streefkerk, Netherlands

[73] Assignee: Den Boer Staal B.V., Groot-Ammers, Netherlands

[21] Appl. No.: 802,917

[22] Filed: Feb. 20, 1997

Related U.S. Application Data

[63] Continuation of Ser. No. 496,437, Jun. 29, 1995, abandoned.

[51] Int. Cl.$^6$ ..................... B29G 43/32

[52] U.S. Cl. ..................... 425/421; 425/424; 425/432; 425/456; 264/71; 100/231; 100/265; 100/268

[58] Field of Search ..................... 425/421, 424, 425/432, 456; 264/71; 100/231, 265, 268

[56] References Cited

U.S. PATENT DOCUMENTS

| | | | |
|---|---|---|---|
| 2,407,168 | 9/1946 | Lindkvist | 425/421 |
| 2,831,230 | 4/1958 | Neth et al. | 425/421 |
| 3,635,609 | 1/1972 | Balamuth | 425/421 |
| 3,712,785 | 1/1973 | Hirt et al. | 425/421 |
| 4,111,627 | 9/1978 | Kitahara | 425/421 |
| 4,119,692 | 10/1978 | Durinck | 425/421 |
| 4,179,258 | 12/1979 | Karas et al. | 425/421 |
| 4,395,213 | 7/1983 | Springs et al. | 425/421 |

FOREIGN PATENT DOCUMENTS

| | | | |
|---|---|---|---|
| 2 496 541 | 6/1982 | France . | |
| 28 55 875 | 6/1980 | Germany . | |
| 610810 | 10/1960 | Italy | 425/421 |
| 1660963 | 7/1971 | U.S.S.R. . | |
| 627972 | 8/1978 | U.S.S.R. | 425/421 |
| 1269997 | 11/1986 | U.S.S.R. | 425/421 |
| 1142615 | 2/1969 | United Kingdom . | |

*Primary Examiner*—Khanh P. Nguyen
*Attorney, Agent, or Firm*—Young & Thompson

[57] ABSTRACT

An installation for compacting concrete mix includes a frame which has a lower plate and an upper plate between which concrete mix can be accommodated. The plates can be pressed in the direction towards one another and can be made to vibrate with respect to one another in order to compact the mix. Each plate is connected to the frame via an associated spring-mounted massive body.

6 Claims, 2 Drawing Sheets

COMPACTING INSTALLATION

This application is a continuation of application Ser. No. 08/496,437, filed Jun. 29, 1995, now abandoned.

FIELD OF THE INVENTION

The invention relates to an installation for compacting concrete mix, comprising a frame which has a lower plate and an upper plate between which concrete mix can be accommodated, which plates can be pressed in the direction towards one another and can be made to vibrate with respect to one another in order to compact the mix.

BACKGROUND OF THE INVENTION

An installation of this type is disclosed in Netherlands Patent Application NL-A 8,004,995. As a result of the use of a hydraulic vibrating element and a hydraulic press installation, it is possible, using this known installation, to obtain a desired, predetermined vibration/time curve which is suited to the product to be formed, such that the concrete mix is optimally compacted.

This known installation has the disadvantage that the noise level and vibrational level in operation are unacceptably high. Consequently, this installation constitutes an unacceptable burden on the surroundings, whilst it is also not able to meet legal requirements with regard to working conditions. Moreover, the environmental nuisance, caused by noise and vibrations, is too high.

SUMMARY OF THE INVENTION

The aim of the invention is, therefore, to provide an installation of the type described above which does not have these disadvantages. This is achieved because each plate is connected to the frame by means of an associated, spring-mounted massive body.

The relatively large massive bodies prevent vibrations being transmitted to the frame. An additional advantage of these bodies is that a substantial machine foundation is no longer required since said foundation only has to take the weight of the installation but does not have to absorb the dynamic forces which are associated with the vibrating function of the installation.

Preferably, the upper plate is connected to the associated upper massive body by means of an exciter, whereas the lower plate is connected to the associated lower massive body by means of a pressure cylinder.

The frame is so constructed that the latter has, on the one side, a set of anchor points for the upper massive body and, on the other side, a set of anchor points for the lower massive body, and at least the frame sections which connect the sets of anchor points are rigid. With this arrangement the frame comprises two parallel plate sections, each of which has a vertical section which connects two horizontal sections, which horizontal sections carry the anchor points.

BRIEF DESCRIPTION OF THE DRAWINGS

The invention will be explained in more detail below with the aid of the illustrative embodiment shown in the figures.

DETAILED DESCRIPTION OF THE INVENTION

Figure 1:
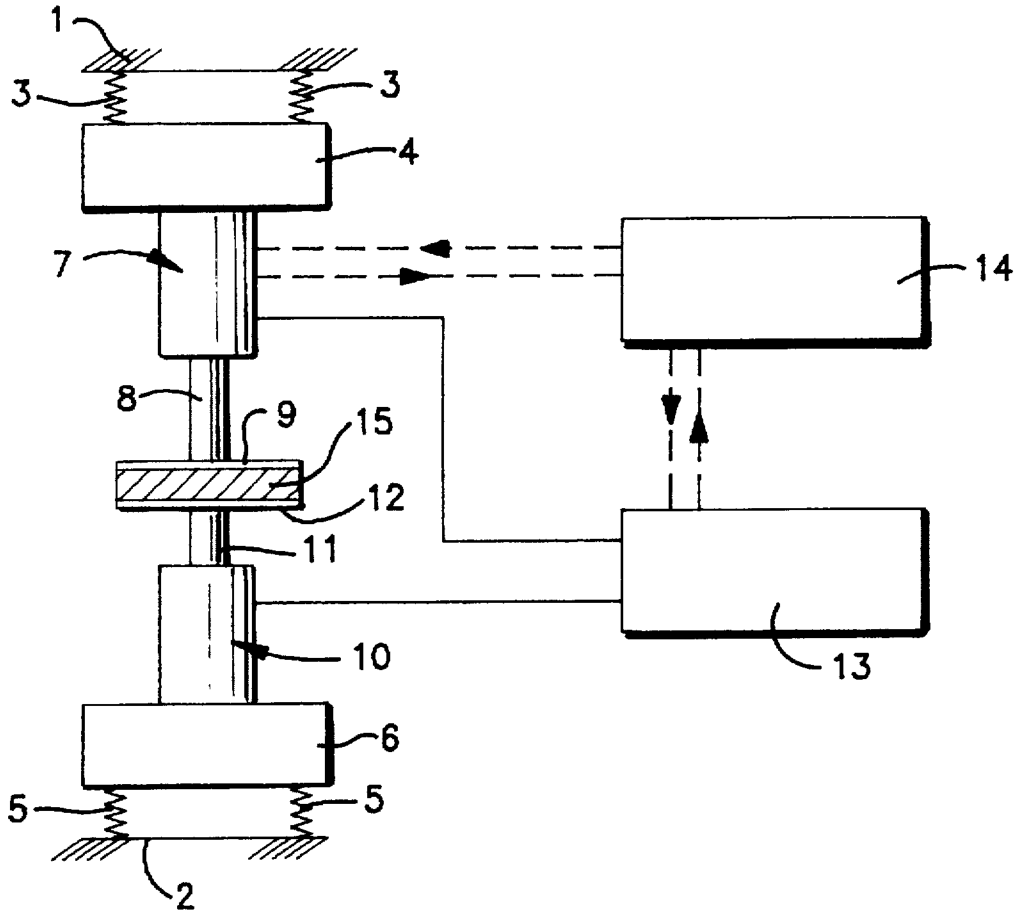
FIG. 1 is a schematic diagram of the installation according to the invention.

In the schematic diagram shown in FIG. 1, 1 and 2 indicate frame sections on which the upper massive body 4 is mounted by means of springs 3 and the lower massive body 6 is mounted by means of springs 5. The upper massive body carries a hydraulic exciter 7, an upper plate 9 being fixed to the piston rod 8 thereof.

The lower massive body carries a pressure cylinder 10, the lower vibrating plate 12 being fixed to the piston rod 11 thereof.

Both the exciter 7 and the pressure cylinder 10 can be operated by means of the hydraulic unit 13. The hydraulic unit 13 is controlled by means of the control and regulator unit 14.

In the installation according to the invention, compaction of the product 15, which is located between the upper plate 9 and the lower plate 12, is effected by a combination of excitation and compression. The vibrations are generated by means of the hydraulic system 13, 14.

The hydraulic system 13, 14 also provides the compression function.

With this arrangement, the vibrating components of the installation, in particular the vibrating plates 9, 12, exciter 7 and pressure cylinder 10, can develop severe vibration, which vibrations are transmitted to the upper massive body 4 and the lower massive body 6. The massive bodies 4, 6 have such a high mass that the violent vibrations of the components 7, 9, 12 and 10 are not able to be transmitted directly to the frame 1, 2. The spring mountings 3, 5 also form a supplementary barrier against transmission of vibrations to the frame 1, 2.

Figure 2B:
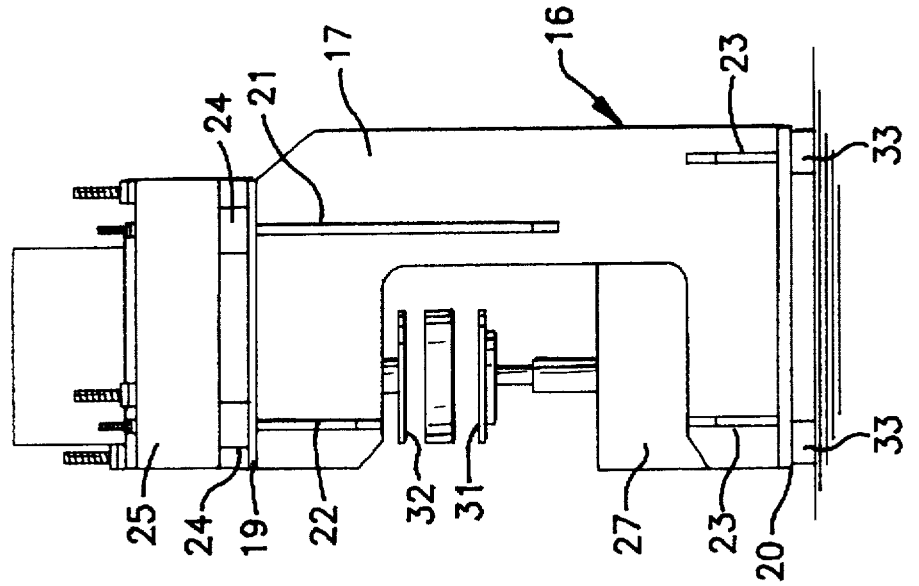
FIGS. 2*a* and 2*b* show, respectively, a front and a side view of an embodiment of the installation according to the invention.
Figure 2A:
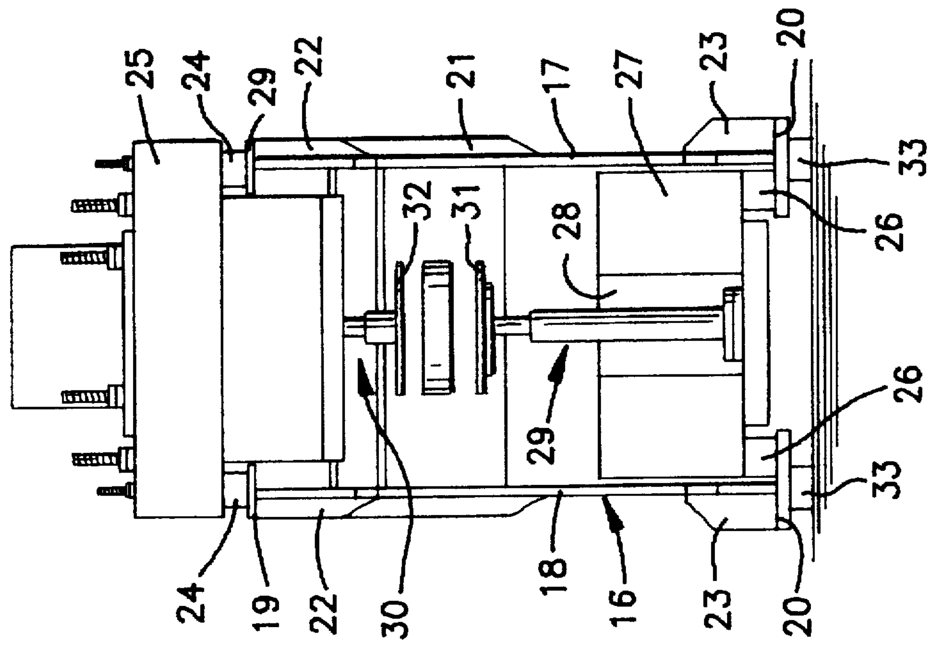

The compaction installation shown in FIGS. 2*a* and 2*b* makes use of the construction principle shown in FIG. 1. This installation comprises a very rigid frame 16, which constitutes a closed system and contains two C-shaped walls 17, 18. Support plates 19, 20 are fitted on the horizontal arms of the walls, which support plates are firmly fixed to the walls 17 by means of support strips 21, 22 and 23. The spring mountings 24 for the upper massive body 25 and, respectively, the spring mountings 26 for the lower massive body 27 are fitted on said support plates 19, 20.

The lower massive body 27 has a recess 28, in which the hydraulic press 29 is incorporated. The exciter 30 is suspended from the upper massive body 25. The massive bodies are provided with, respectively, a lower vibrating plate 31 and an upper vibrating plate 32.

With a rigid construction of this type, provided with the massive bodies 25 and 27, it is not necessary to provide a substantial foundation. The frame 16 is therefore also supported on spring base mountings 33. This means that the transmission of vibrations to the surroundings is greatly reduced, compared with that from known vibratory installations.

We claim:

1. Installation for compacting concrete mix, comprising:
   - a frame, a lower plate and an upper plate for accommodating concrete mix therebetween; an upper massive body connected to the upper plate and a lower massive body connected to the lower plate; one of the upper plate and the lower plate being connected to its respective body via an exciter; means operatively associated to the exciter for pressing said plates in a direction towards one another and for vibrating said plates with respect to one another in order to compact the mix;
   - first spring means for connecting said upper massive body to the frame, and second spring means for connecting said lower massive body to said frame.

2. Installation according to claim 1, wherein one of the lower plate and the upper plate is connected to its respective massive body via a pressure cylinder.

3. Installation according to claim 1, wherein the frame comprises two parallel substantially C-shaped walls, each of said walls having a vertical section which connects two horizontal sections.

4. Installation for compacting concrete mixing, comprising:

a frame having two parallel C-shaped walls, each of said walls having a vertical section which connects an upper horizontal arm and a lower horizontal arm;

an upper support plate positioned on the upper horizontal arm, and a lower support plate position on the lower horizontal arm, said upper and lower support plates being fixed respectively to said upper and lower horizontal arms by support strips;

an upper vibrating plate and a lower vibrating plate for accommodating concrete mix therebetween;

an upper massive body connected to the upper plate, and a lower massive body connected to the lower plate, one of the upper plate and the lower plate being connected to its respectively massive body via an exciter;

means operatively associated to the exciter for pressing said upper plate and lower plate in a direction towards one another, and for vibrating said plates which respect to one another to compact the mix; and first spring mountings positioned on said upper support plate for supporting the upper massive body, and second spring mountings fitted on said lower support plate for supporting the lower massive body.

5. Installation according to claim 4, wherein the lower massive body has a central recess for accommodating a hydraulic press.

6. Installation according to claim 4, wherein the exciter is suspended from the upper massive body.

* * * * *